United States Patent Office 2,872,345
Patented Feb. 3, 1959

2,872,345
CURING AIR BLOWN OILS WITH SO₂

Ober C. Slotterbeck, Clark, and Merilyn A. Tucker, Cranford, N. J., assignors to Esso Research and Engineering Company, a corporation of Delaware No Drawing. Application April 1, 1957
Serial No. 649,639

10 Claims. (Cl. 117—62)

This invention relates to the curing of air blown hydrocarbon drying oils and relates more particularly to the curing of thick films of such oils with sulfur dioxide at ordinary or only slightly increased temperatures.

It is known to prepare films from liquid polymers of diolefins or copolymers of such diolefins with monomers copolymerizable therewith. These films have been cured by air drying or baking in an oven for about 30 minutes at 300°–350° F. However, it has not been possible to cure relatively thick films (more than 1.5 mils in thickness) of these oils with any degree of satisfaction.

Recently it has been found that reasonably thick films (1.5 to 3 mils) can be cured provided the oil is first oxidized to contain 10 to 20% oxygen by blowing with the air or oxygen at a temperature between 20° and 280° F. in the presence of a solvent. However, such oils even in the presence of a drier require at least five days to air dry.

In accordance with the present inveniton it has now been found that even thicker films can be cured (5 mils or thicker) in a very short time by contacting with gaseous sulfur dioxide alone or in combination with promotors or crosslinking agents at room temperature or at slightly elevated temperature to give hard, chemically resistant coatings.

The synthetic oils to which present invention are applicable are oily polymers of butadiene, isoprene, dimethylbutadiene, piperylene, methylpentadiene or other conjugated diolefins having 4 to 6 carbon atoms per molecule. Instead of polymerizing any of the aforesaid diolefins alone, they may be copolymerized in mixtures with each other or in admixtures with minor amounts of ethylenically unsaturated monomers copolymerizable therewith, e. g., with 5–30% styrene, styrenes having alkyl groups substituted on the ring such as paramethyl styrene, dimethyl styrene, diethyl styrene, acrylonitrile, methacrylonitrile, methyl acrylate, methyl methacrylate, vinyl isobutyl ether, methyl vinyl ketone, and isopropyl methyl ketone. Such synthetic oils may be advantageously prepared by mass polymerization, either in the presence of a hydrocarbon soluble peroxide catalyst, such as benzoyl peroxide or cumene hydroperoxide or in the presence of metallic sodium. Suitable polymerization methods are illustrated below. Throughout the present description it will be understood that all proportions are expressed on a weight basis unless otherwise specified.

SYNTHESIS METHOD A

For example, 100 parts of butadiene-1,3, 50 parts of straight run mineral spirits boiling between 150° and 200° C. (Varsol), 3 parts of tertiary butyl hydroperoxide (60% pure) and 0.75 part of diisopropyl xanthogen disulfide are heated in a closed reactor at about 90° C. for 40 hours whereupon the residual pressure is released and the unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some tertiary butyl alcohol. This solution of polymer is then preferably fractionated to remove the dimer and usually adjusted to 50% non-volatile matter content. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U. S. patent application, Serial No. 782,850 of Arundale et al., filed on October 29, 1947, now Patent No. 2,586,594, which describes alternative monomers, catalysts, reaction diluents, polymerization modifiers, suitable ranges of proportions of the various ingredients, suitable ranges of polymerization conditions, etc.

SYNTHESIS METHOD B

An alternative polymerization method using sodium as catalyst is illustrated as follows: 80 parts of butadiene-1,3, 20 parts of styrene, 200 parts of straight run mineral spirits boiling between 150° and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or other anhydrous organic acid, and filtered. Instead of neutralizing the alcohol treated product, the acid may also be added directly to the crude product containing residual metallic sodium and the latter destroyed by the acid. The colorless filtrate is then fractionally distilled to remove the alcohol and modifiers such as dioxane. Finally, additional hydrocarbon solvent is preferably distilled off until a product containing about 50–95% non-volatile matter is obtained, the non-volatile matter being a drying oil having a molecular weight below 10,000, preferably between about 2,000 to 5,000.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having 3 to 8 carbon atoms such as methyl ethyl ether, dibutyl ether or phenetole; or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about −15° and 250° C., preferably between 60° and 200° C., e. g., butane, benzene, xylene, naphtha, cyclohexane, and the like. The diluents are usually used in amounts ranging from 50 to 500 parts per 100 parts of monomer. The reaction temperature may vary between about 40° C. and 100° C., preferably around 65° to 85° C. As a catalyst, 0.1 to 10 parts of dispersed metallic sodium is used per 100 parts of monomers, sodium particle sizes below 100 microns being particularly effective.

The blowing of the above polymeric drying oils with air or oxygen is best carried out in a solvent of moderate to good solvency, e. g., solvents or solvent mixtures having a kauri butanol value of at least 40. At least a substantial portion of aromatic solvent is generally needed to secure such a K. B. value, and such aromatic content is highly beneficial in promoting oxygen uptake during the blowing treatment. It also aids materially in permitting high oxygen contents to be secured in the treatment without encountering the instability which induces gelation of the mass being treated. Other strong solvents, such as oxygenated solvents, have similar benefits. While mixtures of high and low K. B. value solvents are generally useful, the oil can be dissolved in strong solvent(s) from the start, thereby eliminating low solvency solvents. The choice of solvents will, of course, depend on the oxygen content which is desired in the finished oil as well as on the formulations of the coating compositions which are to be made from the blown oil, and in the interest of economy it is generally desirable to use the cheapest solvent(s) which possess the needed attributes of kauri butanol value and compatibility with the various ingredients of the finished coating vehicle which is to be formulated.

Examples of suitable solvents include aromatic or mixtures of aromatic and aliphatic hydrocarbons boiling up to about 250° C. The aromatic solvent may be benzene, toluene, hemimellitene, pseudocumene, mesitylene, propyl benzene, cymene, ethyl toluene, methyl ethyl benzene, xylenes, Solvesso–100 (a mixture of aromatic hydrocarbons boiling from about 150° to 175° C.), Solvesso–150 (a mixture of aromatic hydrocarbons boiling from about 190° to 210° C.), or mixtures thereof. Other suitable solvents include the Varsols which are straight run mineral spirits boiling in the range of 140° to 205° C., having API gravities of 40 to 55 and varying in aromatic content from 5 to 35 wt. percent.

Catalysts suitable for the oxidation reaction of this invention include organic salts of metals such as the naphthenates, octoates, and other hydrocarbon soluble metal salts of cobalt, lead, iron and manganese. These catalysts are used in amounts ranging from 0.001% to 1.0%. Peroxides such as benzoyl peroxide and the like may be added to reduce the induction period.

It is understood that conditions of temperature and time of reaction, ratio of reactants, degree of dilution, presence or lack of solvents and the like will depend upon factors including the degree of oxidation desired and the nature of the starting polymer; therefore, it is not intended that the invention be limited by the specific conditions and examples herein set forth as it is intended to illustrate and not limit the invention.

The nature of the oxidized diolefin polymer depends largely upon the extent of oxidation which in turn depends on various factors including time of oxidation, temperature, presence or absence of catalysts, type of solvent, etc. In general, greater extent of oxidation results in a lower solubility of the oxidized polymer in paraffin hydrocarbon solvents. The oxidation can be carried out such that the product is soluble in paraffinic hydrocarbons indicating that the oxidation has proceeded to a relatively slight extent. The oxidation can also be carried out so that the product is insoluble in paraffinic solvents but is completely soluble only in aromatic solvents indicating that the oxidation has proceeded to a high degree. The percent of oxygen in the product will vary according to the conditions from a trace to 20% or more.

According to this invention, the oxidized oil alone or blended with a promoter is applied to the desired surface and then treated with the sulfur dioxide. The treatment may be accomplished in any desired manner. For example, an underground pipe line could be opened at each end, then cleaned with wire brushes and finally coated with the oxidized oil with a pneumatic plug and cured by filling the pipe with gaseous sulfur dioxide and letting stand for from a few minutes to a half hour. The inside or outside surfaces of large tanks or other equipment could be similarly treated.

If desired the curing may be continued by baking the sulfur dioxide-cured coatings for 10 to 30 minutes at various temperatures (e. g., between 100° and 250° F.).

Improved film properties especially those cured at room temperature can be obtained by the addition of cross-linking agents or promotors to the oxidized polymer prior to $SO_2$ curing. These reagents include a class of polyfunctional compounds, such as polyamines, urea or phenolic formaldehyde resins and diisocyanates. The half-blocked isocyanate prepared from trimethylol propane and tolylene diisocyanate, wherein only one of the isocyanate radicals is reacted, is particularly effective for increasing film hardness values when post-cured with $SO_2$ at room temperatures. Other blocked isocyanates prepared from alcohols, phenols or glycols are also effective.

The following specific examples are presented to illustrate the effects of the present invention. All quantities are expressed in this specification and claims on a weight basis unless stated otherwise.

Example I

A butadiene-styrene drying oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight run mineral spirits; API gravity, 49.0; flash, 105° F.; boiling range, 150° to 200° C.; solvent power, 33–37 kauri-butanol value (reference scale: Benzene—100 K. B. value, n-heptane 25.4 K. B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% N. V. M. The resulting product had a viscosity of 1.5 poises at 50% N. V. M. in Varsol solution and the non-volatile portion thereof had an average molecular weight of about 3,000.

The polymer oil thus obtained was dissolved in Solvesso–150 (a substantially 100% aromatic hydrocarbon cut boiling 365°–415° F.) to make a 35% N. V. M. solution. It was then blown with air at about 230° F. until the oxygen content reached the desired content.

Example II

Sulfur dioxide was passed into Erlenmeyer flasks containing oxidized oils prepared in accordance with Example I. One of the flasks contained an oil which had been oxidized to an oxygen content of about 10% (oil A), another an oil containing about 16% oxygen (oil B), while a third was a mixture of oil A with a small amount of oil B (oil C). Each of the flasks were maintained at room temperature. The sulfur dioxide reacted with oil B immediately, forming a thick rubbery gel. Oil A took about 20 minutes to gel, while the gel time for oil C was intermediate between oils A and B.

Example III

Sulfur dioxide was passed into a tin can containing metal panels that had been coated with an oxidized oil prepared according to Example I and containing 16% oxygen. The following data were obtained at various exposure times to the sulfur dioxide with and without additional oven baking at various times and temperatures:

| | SO₂ Exposure Time | Additional Baking Time, Temperature, degrees | Thickness, mils | Hardness | |
|---|---|---|---|---|---|
| | | | | Sward | Pencil |
| Control-oxidized oil (air dried for 30 min.) | None | None | Tacky | Tacky | Tacky |
| Oxidized oil | 30 | do | 2 | 6 | |
| Do | 30 | do | 5.5 | 2 | <6B |
| Do | 15 | do | 1.6 | 8 | HB |
| Do | 15 | 15 min. @ 250° F | 1.6 | 54 (Brittle) | 2H(Brittle) |
| Do | 30 | 30 min. @ 140° F | 2.0 | 18 | H |
| Do | 10 | 10 min. @ 140° F | 3.0 | 8 | 3B |
| Do | 20 | | 3.7 | 4 | 5B |
| Do | 20 | 6 days R. T | 3.7 | 10 | B |

*Example IV*

A panel coated with a film of an oxidized polymer oil containing 16% oxygen was contacted with sulfur dioxide for 15 minutes. At the end of the exposure the oil had a Sward hardness of 8. Preheating the panel 15 minutes @ 140° F. and followed by SO₂ treatment increased the Sward hardness to 22. The coated panels were tested for resistance to water, grease, soap and dilute caustic. The following results were obtained:

| Panel | Thickness, mils | Sward Hard. | 5 Hrs. H₂O | 2 Hrs. Grease | 2 Hrs. Soap | 1% NaOH (1 Hr.) |
|---|---|---|---|---|---|---|
| SO₂ Cured | 1.6 | 8 | (1) | (0) | (3) | (1) |
| Preheated 15′ @ 140° F. + SO₂. | 1.4 | 22 | (1) | (0) | (1) | (1) |

0=unaffected. 9=failure.

The above films were resistant to heptane and light crude oil after immersion for 24 and 314 hours, respectively.

*Example V*

The oxidized polymer oil of Example IV was blended with various percentages of a half-blocked isocyanate and then contacted with sulfur dioxide at room temperature. The half-blocked isocyanate was prepared by the reaction of molar equivalents of trimethylol propane and tolylene diisocyanate (80% 2,4 and 20% 2,6 tolylene diisocyanate) in ethyl acetate solution. Each 10 ml. of the reacted solution contained 0.038 equivalents of free NCO groups. The following data show the improvement in film properties by the combination in which the indicated oils were painted on steel panels and exposed to sulfur dioxide at room temperature.

| | Controls | SO₂ Exposure Time, min. | Thickness, mils | Sward Hardness |
|---|---|---|---|---|
| 1 | 30′ Air Dried Oxidized Oil | None | Tacky | Tacky |
| 2 | 30′ Air Dried Oxidized Oil (5 g.)+0.0038 Eq. Blocked Isocyanate. | None | Tacky | Tacky |
| 3 | Oxidized Oil | 30 | 5.5 | 2 |
| 4 | 5 g. Oxidized Oil+0.0038 Eq. Blocked Isocyanate. | 30 | 3.4 | 16 |
| 5 | 5 g. Oxidized Oil+0.0114 Eq. Blocked Isocyanate. | 30 | 5.8 | 20 |
| 6 | 5 g. Oxidized Oil+0.019 Eq. Blocked Isocyanate. | 30 | 6.3 | 24 |

Panel No. 6 showed the following improved chemical resistances:

| Panel | 5 Hrs. H₂O | 2 Hrs. Grease | 2 Hrs. Soap | 1% NaOH (1 Hr.) |
|---|---|---|---|---|
| 0.019 Eq. Blocked Isocyanate+SO₂ | 0 | 0 | 0 | 0 |

The data in the above examples show that sulfur dioxide can be used to cure films of oxidized polymer oils and that the properties of the resulting cured films may be controlled over a wide range by regulating the curing time, the temperature of cure and the thickness of the film.

The nature of the present invention having been thus fully set forth and specific examples of the same given, what is claimed as new and useful and desired to be secured by Letters Patent is:

1. A process for improving the hardness of films prepared from synthetic hydrocarbon drying oils which comprises first reacting the oil at a temperature between 20° and 280° F. with oxygen, applying a film of oil to a surface, and then subjecting a film of the resulting oxidized oil to the action of sulfur dioxide.

2. A process according to claim 1 in which the sulfur dioxide-treated film is further cured by baking between 10 and 30 minutes at a temperature between 100° and 250° F.

3. A process for improving the hardness of films prepared from synthetic hydrocarbon drying oils which comprises first reacting the oil at a temperature between 20° and 280° F. with oxygen, applying a film of oil to a surface, then reacting the oxidized oil with the reaction product of molar equivalents of trimethylolpropane and tolylene diisocyanate to produce a cross-linked oil, and finally subjecting a film of the resulting cross-linked oil to the action of sulfur dioxide at room temperature.

4. Process according to claim 1 in which the drying oil is a copolymer of butadiene and styrene.

5. Process according to claim 3 in which the drying oil is a copolymer of butadiene and styrene.

6. A coating composition comprising the reaction product of an oxidized synthetic hydrocarbon drying oil and sulfur dioxide.

7. Composition according to claim 6 in which the drying oil is a copolymer of butadiene and styrene.

8. A steel panel coated with an oxidized synthetic hydrocarbon drying oil which has been cured by contact with sulfur dioxide.

9. A panel according to claim 8 in which the drying oil is a copolymer of butadiene and styrene.

10. A steel panel according to claim 8 in which the sulfur dioxide cured coating is further cured by baking between 10 and 30 minutes at a temperature between 100° and 250° F.

No references cited.